United States Patent [19]

Carpinone

[11] Patent Number: 4,655,915
[45] Date of Patent: Apr. 7, 1987

[54] AIR STONE

[76] Inventor: Joseph S. Carpinone, 71 Katherine St., Port Jefferson Station, N.Y. 11776

[21] Appl. No.: 784,504

[22] Filed: Oct. 4, 1985

[51] Int. Cl.$^4$ .......................... E04H 3/16; E04H 3/20
[52] U.S. Cl. .................... 210/169; 210/416.1; 210/416.2; 210/221.2; 261/124; 119/5
[58] Field of Search ............. 210/169, 488, 416.1, 210/221.2, 416.2; 261/124, 122; 119/5

[56] References Cited

U.S. PATENT DOCUMENTS

| | | | |
|---|---|---|---|
| 2,770,319 | 12/1956 | Hagenbook | 261/124 |
| 2,917,295 | 12/1959 | Hauer | 261/124 |
| 3,160,588 | 12/1984 | Alarie | 210/488 |
| 3,321,082 | 5/1967 | Willinger | 210/169 |
| 3,782,549 | 1/1974 | Mullen | 210/488 |

Primary Examiner—Andrew H. Metz
Assistant Examiner—Sharon T. Cohen
Attorney, Agent, or Firm—Leonard Belkin

[57] ABSTRACT

An air stone for use in aquariums for aeration of the water contained therein comprising a hollow tube for receiving air under pressure and holes for the discharge of the air. The opposite end of the tube is closed off by a solid portion which is threaded. Adjacent to the tube end for receiving the air is a stop means and a plurality of annular disks which are located on the tube downstream from the stop means. A pair of nuts are employed threaded on the lower end, solid tube portion to compress the disks and thereby controlling the size of the bubbles emanating from between the disks.

4 Claims, 3 Drawing Figures

AIR STONE

BACKGROUND OF THE INVENTION

This invention relates to an air stone and more particularly to an air disperser for use in aquariums.

The typical aquarium in use consists of a tank of water provided with a source of heat and a thermostat to maintain a temperature suitable for the life contained therein, a filter through which to recycle the water to remove dust and other debris, a lighting system, and provision for aerating the water to insure an adequate supply of oxygen.

In addition, the aquarium could and usually is provided with a variety of features to enhance its appearance, and feeding devices to prevent the food from falling to the bottom of the tank.

Aeration of the water is generally accomplished by supplying air under a slight pressure to a bubbling device located at the bottom of the tank variously known in the industry as an air releaser, bubbler, or an air stone. There are a variety of air stones on the market. One air stone currently available is constructed of fused silica glass beads, the resulting product being porous. When air under pressure is fed into the air stone, small bubbles escape through the outer surface and bubble up through the water thereby aerating the latter. The air stone and other similar bubbling devices eventually become clogged from salts and minerals which are present in a dissolved state in the water. This is believed to occur as a result of the interface between the water and the air within the air stone causing evaporation of water leaving behind the salts and minerals in solid state.

Cleaning of the aerating devices is usually troublesome and inconvenient, and very often not adequately effective. For example, in the air stone referred to above, the instructions for cleaning call for soaking the device in a diluted bleach solution for five minutes. This is inconvenient and becomes less effective as the cleaning is repeated.

Attempts to overcome the drawbacks and problems associated with the use of the fused silicon glass beads include a device which comprises a pair of members one with a serrated surface threaded into contact so that by adjusting the tightness an adjustment of bubble size can be accomplished. Such a device has been found to be incapable of bringing the bubble down to a size where it is most effective or to have the degree of control over bubble size which is desired, and at the same time provide an adequate supply of bubbles.

SUMMARY OF THE INVENTION

This invention overcomes or reduces the problems associated with aeration devices now in use by providing an air stone which is adequately effective, has a high degree of control over bubble size, yet is easy to clean and maintain and provides and adequate supply of bubbles.

In a preferred embodiment of this invention the air stone consists of a tube for receiving the air under pressure at one end and a solid portion closing off the other end of the tube. A stationary stop is mounted on the tube adjacent the air inlet and a plurality of spaced openings are found in the tube between the stop and the solid portion for permitting discharge of the air. A stack of washers or perforated disks are located on the tube between the stop and the solid portion which is threaded to accommodate a pair of nuts to tighten the disks up against the stop. The disks are made from a synthetic, hydrophobic polymer so that a cloud of very fine bubbles are emitted from the air stone from between the disks to aerate the aquarium water.

The air stone embodying the principles of this invention is capable of producing an adequate supply of bubbles at a controllable bubble size which are very effective in aerating the water and yet is readily disassembled so that the parts may be rinsed clean of any accumulation of material.

It is thus a principal object of this invention to provide an effective air dispersing device for use in aquariums which is readily cleanable by disassembly and rinsing.

DESCRIPTION OF THE PREFERRED EMBODIMENT

Figure 1:
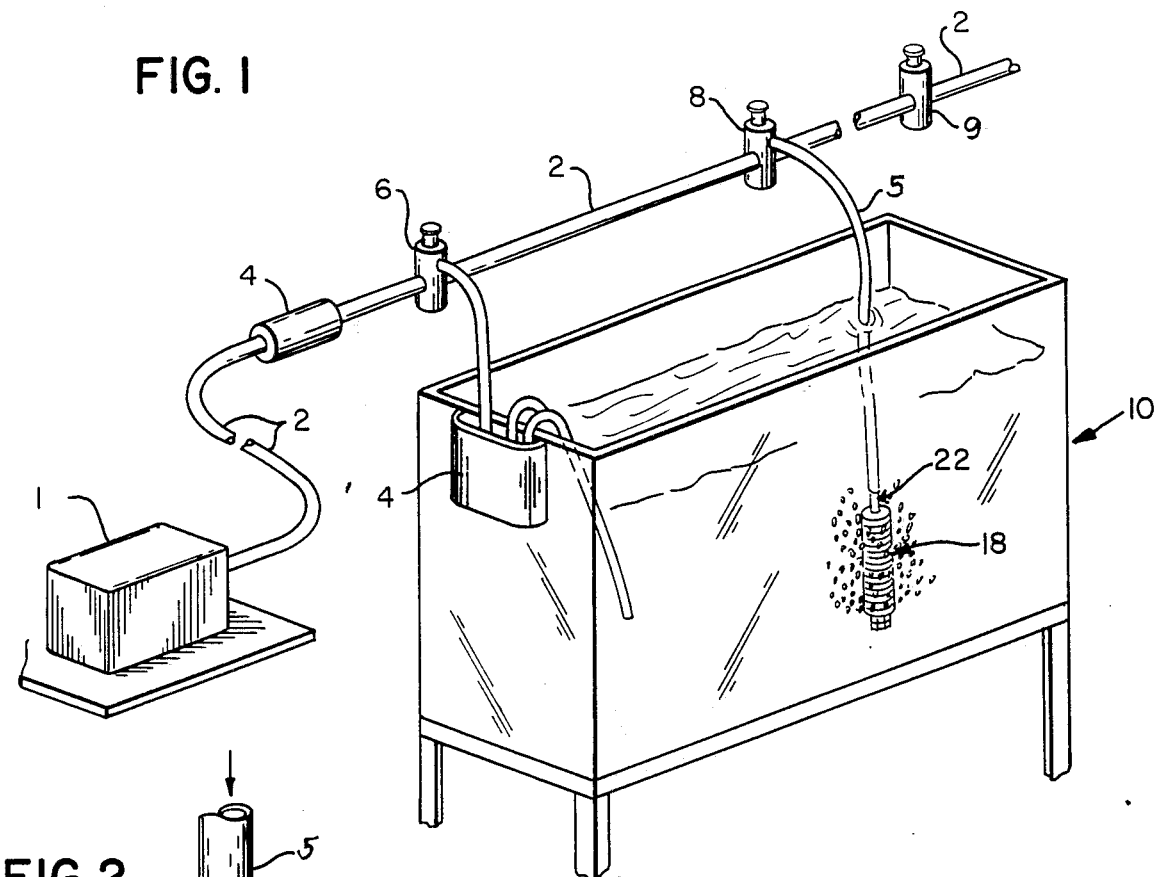
FIG. 1 is a schematic illustration of a home aquarium with an air filtration and releasing system incorporating a preferred embodiment of this invention.

Referring to FIG. 1 there is illustrated a typical aquarium consisting of a tank 10 containing a body of water, which may be sweet or salt depending on the type of life to be supported and an electrically operated air pump 1. Mounted on the outside of tank 10 is a filter assembly 4 to remove debris from the water within tank 10. Extending into the water is a tube 5 on the bottom of which is mounted an air stone 18 constructed in accordance with the principles of this invention.

As is understood in the art, pump 1 delivers compressed air into a hose or tube 2 which is provided with an oil and dust filter 4, three-way valves 6 and 8, and a two-way escape or shutoff valve 9. Air pump 1, filter 4, and the air distribution system just described up to and including tube 5 are conventional and do not form a part of this invention. Not illustrated are the heating and lighting systems and other paraphenalia usually incorporated into an aquarium.

Figure 2:
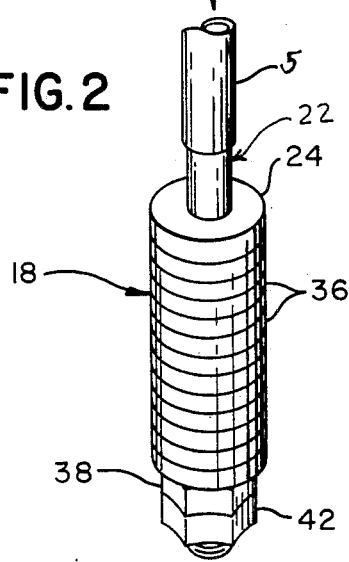
FIG. 2 is an isometric view of the air stone of this invention.
Figure 3:
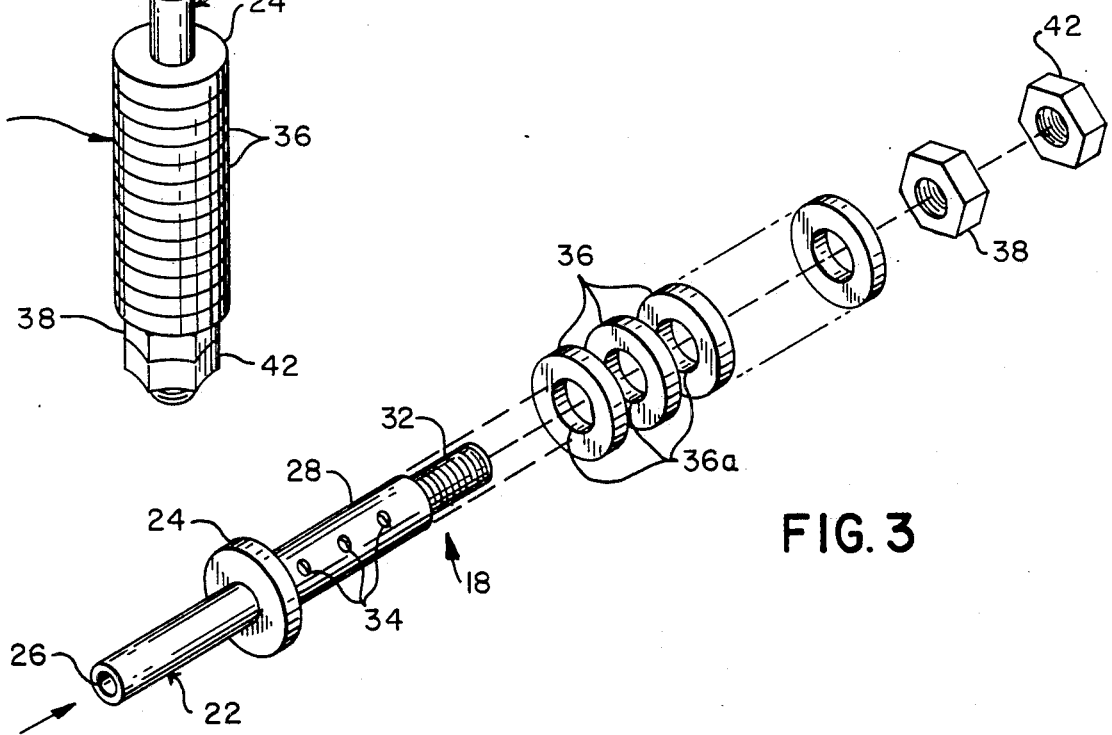
FIG. 3 is an exploded view of the air stone shown in FIG. 2.

For details of air stone 18, reference is made to FIGS. 2 and 3 in which it is seen that it consists of a hollow tube member 22 with a disk-shaped stop member 24 mounted on and integral with tube member 22 adjacent the end 26 where air under pressure from tube 5 enters air stone 18 as shown by the arrow.

Downstream of stop member 24 tube member 22 has a section 28 with an enlarged diameter and terminates in a solid portion 32 closing off that end of tube 22. Solid portion 32 is provided with screw threads for a purpose to be described below. A purality of holes 34 are spaced along section 28 for the discharge of air entering tube member 22 at 26. Holes 34 may be of any convenient shape and may be located in a line as shown or distributed over the circumference of section 28.

A plurality of annular disks or washers 36 are stacked on section 28 downstream of stop member 24. A nut 38 is threaded onto the threaded surface of solid portion 32 to tighten or clamp disks 36 against stop member 24. A second threaded nut 42 may be employed to lock nut 38 against loosening while air stone 18 is in service.

Tube member 22 may be made from a single piece of a rigid plastic material such as the synthetic polymer Tegrin. Disks 36 are made from a synthetic, hydrophobic polymer or a non-wetting material such as nylon and the openings or perforations 36a are larger in diameter than that of section 28 to permit the air to distribute readily over the whole length of section 28. The surfaces of disks 36 and stop member 24 in contact with each other should be smooth.

It has been found that nut 38 can be tightened to adjust the size and volume of bubbles emerging from disks 36. In view of the stack of washers 36 employed, a substantial volume of bubbles is capable of being produced.

As clogging of the spaces between disks 36 occurs due to deposit of salts and other minerals present in the water, bubble size becomes smaller with the result that the effectiveness of air stone 18 actually may first increase. In time the density of the cloud of bubbles begins to drop indicating the need for cleaning air stone 18. Air stone 18 is removed from tube 5, and disassembled by removing nuts 42 and 38 and then disks 36. Disks 36 are rinsed clean and air stone 18 is reassembled and remounted on tube 5. The use of chemical cleaning agents such as a detergent is not required but in some cases may be employed.

It is thus seen that there has been provided an improved device for the aeration of water in aquarium systems or other bodies of water to be aerated and that the invention is susceptible to many changes and variations without departing from the principles of this invention as defined in the following claims.

What is claimed is:

1. An air stone for use in combination with an aquarium containing water for receiving air and diffusing said air in the form of bubbles within said water for aeration thereof, said air stone comprising a stack of annular discs on a tube with an inlet for receiving said air under pressure at the upper end thereof and having a lower end, means closing off said lower end of said tube, a stationary stop means mounted on said tube adjacent said inlet said tube having openings for the discharge of said air in said tube between said stop means and said lower end, said stack of annular disks stacked on said tube between said stop means and said lower end, and a removable nut and screw means mounted adjacent said lower end for clamping said disks up against said stop means and adjusting the clamping force so that said air under pressure escapes from said tube out of said holes through the spaces between said disks into said water in the form of a cloud of bubbles to aerate said water, said nut and screw means permitting convenient removal of said disks from said lower end of said tube for cleaning.

2. The air stone of claim 1 in which the contacting surfaces of said disks are flat and smooth.

3. The air stone of claim 2 in which said tube is constructed of a rigid plastic material and said disks are constructed of a synthetic hydrophobic polymer such as nylon.

4. The air stone of claim 1 in which a second threaded nut is provided engaged with the threads to insure that the tightening force on said disks remains unchanged during operation.

* * * * *